Jan. 9, 1923.
H. E. HODGSON.
ICE BAG.
FILED FEB. 21, 1919.
1,441,282.
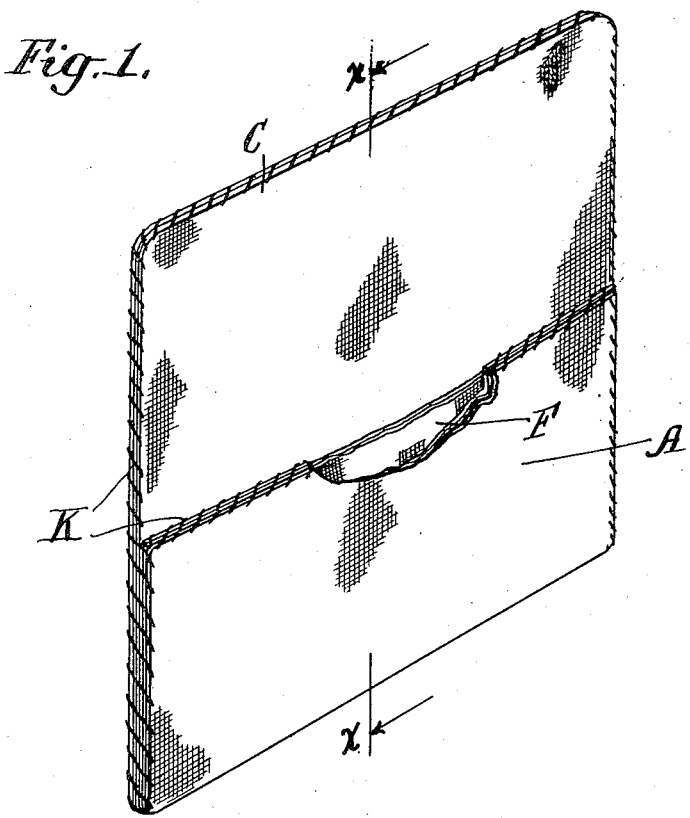
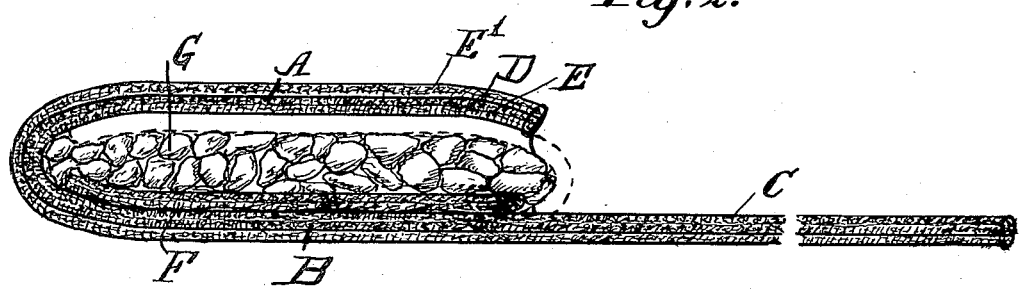
INVENTOR
Harriette E. Hodgson
BY
Frederick S. Duncan ATTORNEY Patented Jan. 9, 1923.

1,441,282

UNITED STATES PATENT OFFICE.

HARRIETTE E. HODGSON, OF NEW YORK, N. Y.

ICE BAG.

Application filed February 21, 1919. Serial No. 278,402.

*To all whom it may concern:*

Be it known that I, HARRIETTE E. HODGSON, of 29 Washington Square, New York city, a citizen of the United States, residing at New York city, in the county of New York and State of New York, have invented certain new and useful Improvements in Ice Bags, of which the following is a full and clear specification.

This invention relates to ice bags used for medical and surgical work; and it has for its object the providing of a comfortable and effective ice bag that will overcome the objections incidental to the use in certain classes of medical and surgical work of waterproof ice bags now commonly employed, and that will be cheap enough for general home use.

Ice bags made of rubber and other material impervious to water are expensive and hard to keep in order.

For many uses they are stiff and uncomfortable and hard to keep in place. They are also clammy and sweat disagreeably and if used too long at a time they blister and cause unsatisfactory conditions to the skin to which they are applied. In many cases of illness and injury it is desirable to keep the skin moist as well as cold; and yet the water from the melting ice must be prevented from freely escaping from the bag or other receptacle containing the same. Ice bags made in accordance with my invention are extremely cheap and yet are effective in accomplishing the objects and avoiding the objections above mentioned. They are soft and flexible and are comfortable under all conditions of application. They allow the desired amount of moisture to reach the skin of the patient; and yet while they become wet with use, they prevent undesirable escape of the water formed by the melting ice. The skin conditions induced by the use of these bags are entirely satisfactory.

This invention is illustrated in the accompanying sheet of drawings, Fig. 1 of which shows in perspective one form of ice bag made in accordance with my invention, Fig. 2 of which shows a cross-section of the ice bag illustrated in Fig. 1 taken on line X X of that figure and, Fig. 3 is an enlarged detail section through two layers of the material embodied in the wall of the device.

The novel features of my invention will be apparent from the drawing and will be particularly set forth in the appended claims.

In the accompanying drawings I have shown an ice bag of rectangular shape illustrating a size 9 inches in length by 4½ inches in height, which I have found desirable for general use. Of course, however, this ice bag may be made of any shape or size desired for special purposes; as for example, a small bag approximately 3½ inches by 2 has been found desirable for use in treatment of the eye. My improved ice bag is composed of several thicknesses (number varying according to size of bag which regulates quantity of ice used) of a fluffy cellular fibrous material such as sheet lint; which I have discovered to have properties that adapt it peculiarly for the use in question. The sheet lint as commonly used for surgical and medical work, is composed of a layer of loosely woven cotton fibre upon which is placed a layer of loosely laid cotton fibre. The structure of this material is indicated in cross-section in Fig. 3 which shows two layers of this material with the unwoven surfaces facing each other. In addition to sheet lint, however, other loosely woven material of cellular fibre having absorbent qualities such as bath towelling and other fabrics especially characterized by the qualities of capillarity and absorption and so woven as to have air containing interstices within the structure of the material, may be used. This material I fold one or more times according to size of bag and quantity of ice to be absorbed and sew into a bag of desired shape; one side of which is preferably provided with a flap that can be tucked into the interior of the bag when filled with ice, to close the same and to help absorb the water from the melting ice.

Any suitable method of folding and sewing the material to form this bag may be followed. In order that a sufficient amount of absorbent cloth should be used to absorb the water from the melting ice in a bag of much greater size and also in order similarly to regulate the heat insulating effect of the material composing the bag, I make the walls of the bag and flap of two or more thicknesses of material according to the size of the bag and amount of ice contained therein. In the case of the small size of bag of the size above mentioned made of sheet lint, two thicknesses have been found sufficient. In the case of larger bags of say about 9 inches by 5 inches or larger, three thicknesses are desirable or in some instances two thicknesses of sheet lint may be used and a separate pad of the same fluffy absorbent material may be placed loosely inside of the bag which separate pad may also be used if desired where three layers are used for the walls of the bag, as shown in Fig. 2. Preferably I arrange the layers with the two unwoven surfaces on the inside and the woven surfaces on the outside. The number of layers of material used should be proportionate to the size of the bag. The number of layers should be such that the water from the melting ice will be substantially absorbed by the cellular material composing the bag and held in the interstices of the material during the period of the melting of the ice. By the time the ice is completely melted, the material will be saturated with water. The bag should then be removed, squeezed out and dried, when it may again be filled with ice. Not only does the fluffy cellular structure of the material used in my bag absorb and hold the water from melting ice and prevent its flowing from the bag but also the air spaces in the material itself and between the layers serve to increase the heat insulating properties of the material composing the bag, thus materially increasing the time during which the ice remains unmelted in the bag. With a bag 9 inches by 4½ composed of three layers of sheet lint, I have found that the cracked ice placed therein will not be entirely melted under ordinary conditions for about three to five hours and that the material in such bag will be sufficient to retain the bulk of the water until after the ice is completely or substantially all melted. If a bag of considerably larger dimensions is to be used the number of thicknesses of sheet lint should be correspondingly increased varying so as to absorb the water from the melting ice with mathematical exactness.

Referring to the drawings, A represents the front wall, B the rear wall and C the flap of the ice bag made in accordance with my invention which is here shown as composed of three layers D, E and E', of material similar to sheet lint having, as indicated in Fig. 3 a loosely woven layer H upon which is placed a layer of loose fibre 1. The dotted lines in Fig. 2 show the flap tucked into the interior of the bag. F is a separate pad laid in the inside of the bag preferably made of the same material as the walls of the bag. G is the crushed ice contained in the bag. K—K indicates the stitching by which the edges of the material forming the walls of the bag are joined together. But as above indicated, the material may be made in any suitable form and joined by seams located at any desired point.

I do not intend to limit myself to any particular size or shape of the bag or to have any specified number of layers or to the particular material above mentioned as peculiarly adapted for use in my improved ice bag. It is evident that such bag may be made in varying forms and dimensions and with other material than that specifically mentioned but having the same general structure and absorbent and heat insulating properties of the bag regulated through the number of layers used with respect to the quantity of ice contained in the bag, without departing from the spirit of my invention.

What I claim as new and desire to secure by Letters Patent is:

1. An ice pad for medical and surgical use comprising a bag the walls of which are made of cellular absorbent fibrous material.

2. An ice pad for medical and surgical use comprising a bag the walls of which are made of cellular absorbent fibrous material and having a flap of similar material.

3. An ice pad for medical and surgical use comprising a bag the walls of which are composed of a plurality of layers of cellular, absorbent, fibrous material having capillary action.

4. An ice pad comprising a bag, the walls of which are composed of cellular absorbent material having heat insulating qualities, sufficient capillary action to permit gradual passage of moisture from a charge of melting ice in the bag to the exterior of the walls and sufficient absorbent action materially to retard the flow of the bulk of the water through the walls.

5. An ice pad for medical and surgical use comprising a bag, the walls of which are made of cellular, absorbent fibrous material having capillary action and provided with a separate pad of similar material contained in said bag.

6. An ice pad for medical and surgical use, comprising a bag the walls of which are composed of loosely arranged absorbent vegetable fibres disposed toward each other so as to form air spaces between such fibres.

7. An ice pad for medical and surgical use, comprising a bag the walls of which are made of a plurality of layers of absorbent vegetable fibres which are so disposed toward each other in said layers and the layers are so arranged with respect to each other as to form air spaces in the fibres of said layers and between said layers said fibers having capillary action.

8. An ice pad for medical and surgical use, comprising a bag, the walls of which are made of sheet lint, which is absorbent and possesses capillary action.

9. An ice pad for medical and surgical use, comprising a bag, the walls of which are made of a plurality of layers of sheet lint which is absorbent and possesses capillary action.

10. An ice pad for medical and surgical use comprising a bag having sides, said sides comprising a layer of absorbent fabric having capillary action whereby moisture is adapted gradually to pass to the exterior surface of the fabric to moisten the skin and a layer of loosely laid strands arranged upon the inner surface of said fabric said strands being absorbent and having capillary action.

11. An ice pad for medical and surgical use comprising a bag, the walls of which are composed of cellular absorbent material of sufficient thickness to allow moisture from melting ice in the bag gradually to pass to the exterior of the bag and to retard the free flow of the bulk of the water until the normal ice charge of the bag is substantially completely melted.

In testimony whereof, I have signed this specification.

HARRIETTE E. HODGSON.